United States Patent [19]
Volpi et al.

[11] Patent Number: 5,417,898
[45] Date of Patent: May 23, 1995

[54] MOLDING PROCESS FOR MAKING TOROIDAL MANUFACTURED ARTICLES FROM CLOSED-CELL, LOW-DENSITY, EXPANDED ELASTOMERIC MATERIAL

[75] Inventors: Alessandro Volpi; Ivano Vismara, both of Milan, Italy

[73] Assignee: Pirelli Coordinamento Pneumatici S.p.A., Milan, Italy

[21] Appl. No.: 138,211

[22] Filed: Oct. 19, 1993

[30] Foreign Application Priority Data

Oct. 19, 1992 [IT] Italy .................. MI92A2391

[51] Int. Cl.⁶ .............................. B29C 44/10
[52] U.S. Cl. .................... 264/26; 264/40.3; 264/51; 264/55
[58] Field of Search ........ 264/40.3, 46.9, 55, 264/40.5, 328.7, 51, 26

[56] References Cited

U.S. PATENT DOCUMENTS

| | | |
|---|---|---|
| 2,271,498 | 1/1942 | Overstreet . |
| 2,525,965 | 10/1950 | Smith . |
| 3,605,848 | 9/1971 | Lombardi et al. ............... 264/46.9 |
| 4,060,578 | 11/1977 | Kisbany ............................ 264/55 |
| 4,208,368 | 6/1980 | Egli ............................... 264/40.3 |
| 4,352,854 | 10/1982 | Siedenstrang et al. . |
| 4,367,109 | 1/1983 | Estrade et al. ................. 264/46.9 |
| 4,422,987 | 12/1983 | Arimatsu ......................... 264/40.3 |
| 4,470,785 | 9/1984 | Koorevaar ..................... 264/46.9 |
| 4,588,542 | 5/1986 | Pierce ............................ 264/45.5 |
| 4,783,292 | 11/1988 | Rogers . |
| 4,909,972 | 3/1990 | Britz .............................. 264/46.9 |
| 4,952,365 | 8/1990 | Shibuya et al. ................ 264/40.3 |
| 5,240,669 | 8/1993 | Kobayashi ..................... 264/40.3 |
| 5,314,648 | 5/1994 | Ichikawa et al. .............. 264/40.5 |

FOREIGN PATENT DOCUMENTS

| | | |
|---|---|---|
| 0438874 | 7/1991 | European Pat. Off. . |
| 62-94314 | 4/1987 | Japan . |
| 1062117 | 3/1967 | United Kingdom . |
| 1189505 | 4/1970 | United Kingdom . |

*Primary Examiner*—Allan R. Kuhns
*Attorney, Agent, or Firm*—Stevens, Davis, Miller & Mosher

[57] ABSTRACT

A toroidal semifinished product (5) made of raw elastomeric material is semivulcanized in a semivulcanization chamber (4) defined between two half-molds (2, 3) disposed close to each other. A pressure, preferably equal to the pressure exerted by the gases generated in the semifinished product (5), is created in the mold (1a). The half-molds (2, 3) are moved apart from each other and pressure in the mold is gradually reduced, thereby giving rise to the expansion and consequent transferring of the semifinished product (5) from the semivulcanization chamber (4) to a surrounding final vulcanization chamber (6). When the inner diameter of the semifinished product (5) is larger than the inner diameter of the final vulcanization chamber (6), said chamber is closed at its inner circumferential edge and then, after possible pressure increase in the mold, at its outer circumferential edge, in order to integrally enclose the semifinished product and enable completion of the vulcanization process.

8 Claims, 3 Drawing Sheets

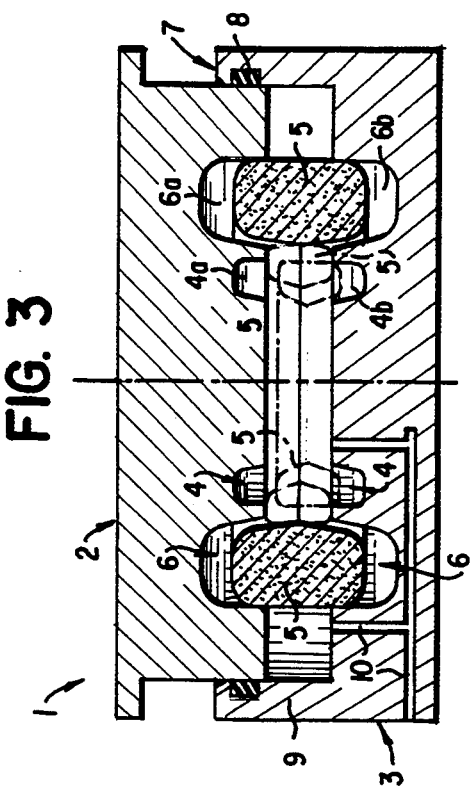
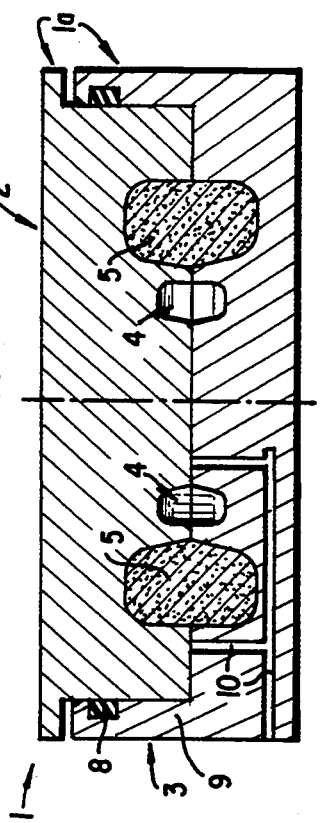
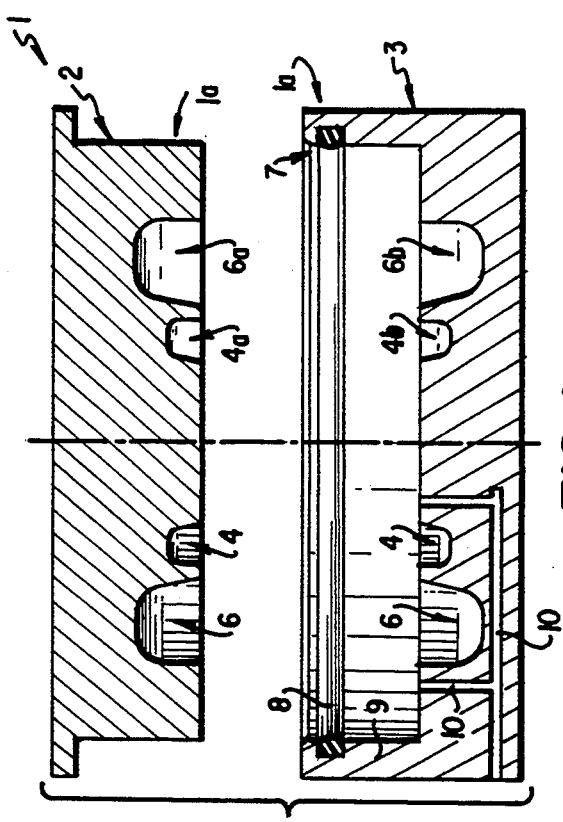
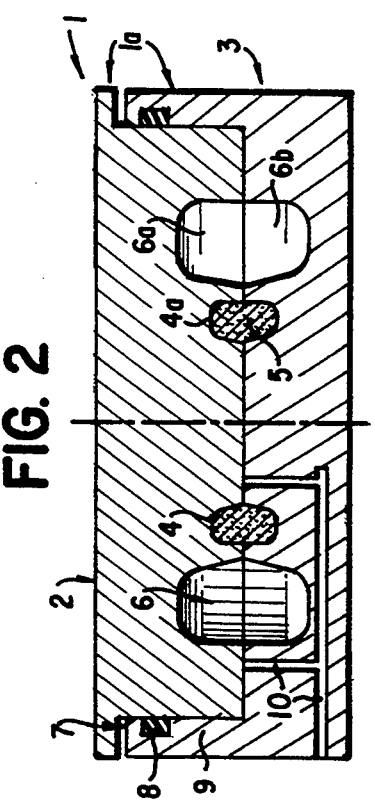

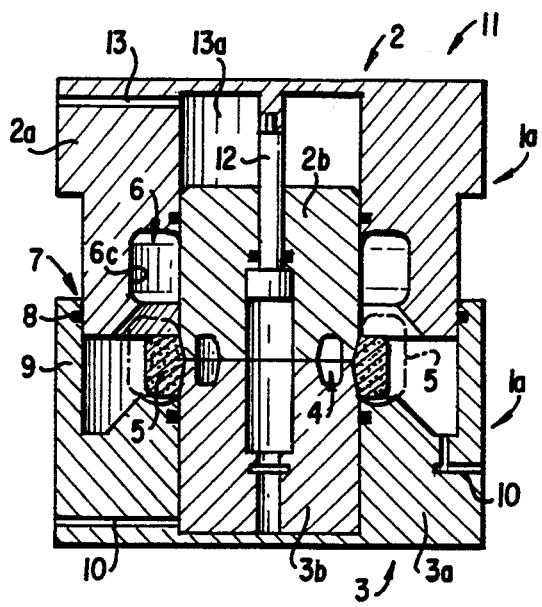
FIG. 8
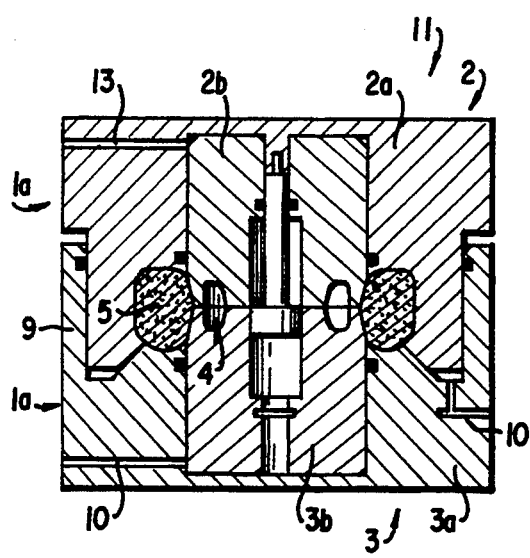
FIG. 9
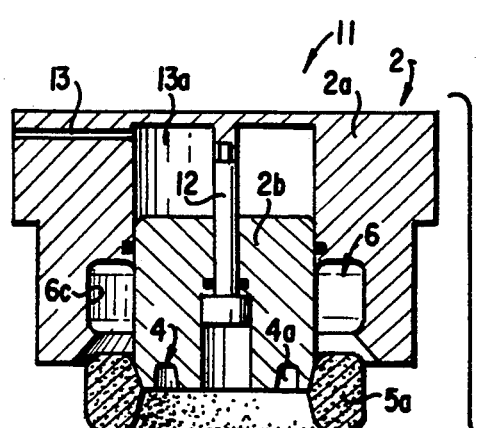
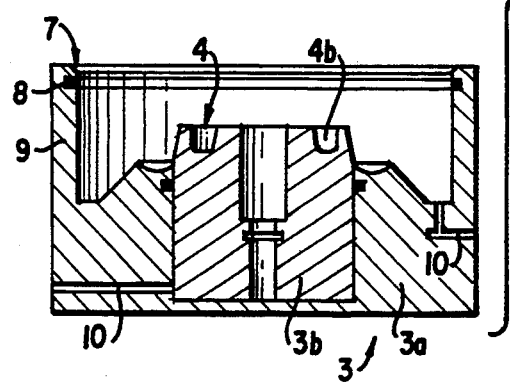
FIG. 10

MOLDING PROCESS FOR MAKING TOROIDAL MANUFACTURED ARTICLES FROM CLOSED-CELL, LOW-DENSITY, EXPANDED ELASTOMERIC MATERIAL

BACKGROUND OF THE INVENTION

The present invention relates to a molding process for making toroidal manufactured articles from closed-cell, low-density, expanded elastomeric material, comprising the steps of: introducing a semifinished product of raw elastomeric material into an annular semivulcanization chamber provided in a mold; closing the mold; semivulcanizing the semifinished product in the semivulcanization chamber; opening the semivulcanization chamber for causing an expansion and a consequent transferring of the semifinished product to the outside of said chamber.

The present invention also relates to an apparatus for putting the above process into practice, said apparatus being of the type comprising: a first half-mold and a second half-mold which are movable between a closed position in which they are located close to each other for defining a semivulcanization chamber designed to accommodate a toroidal semifinished product made of elastomeric material, and an open condition in which there are spaced apart from each other for enabling the semifinished product to be introduced into and extracted from the semivulcanization chamber.

In greater detail, the invention falls within the technical field of the production of toroidally-shaped manufactured articles to be used as such or as a filling material for hollow items of same shape, such as vehicle tires for example, for which a low density, in the order of 120 kg/m$^3$ for example, and a closed-cell cellular structure are required.

It is known that for making manufactured articles of elastomeric material it is provided that a predetermined amount of raw elastomeric material be introduced into the cavity of a heated mold, within which mold the material undergoes a blowing process and a simultaneous vulcanization. In greater detail, blowing is caused by appropriate foaming agents that, previously introduced into the blend of the raw elastomeric material, give rise to the generation of gas in the form of small pockets or cells homogeneously distributed in the material mass.

Depending on the degree of the expansion occurred in the vulcanization step, the cells in the expanded material will be "open", that is mutually interconnected, or vice versa "closed", that is separated from one another by thin walls of elastomeric material. More particularly, the larger the expansion undergone by the material during the vulcanization step is, the greater the amount of open cells is, as compared to the closed cells.

From the foregoing it appears that it is presently very difficult to produce manufactured articles of closed-cell expanded material having a density lower than predetermined limits. By adopting the usual techniques according to which the expansion and vulcanization of the semifinished product are completed in a single step within the mold, the production of closed-cell manufactured articles having a lower density than approximately 300 kg/m$^3$ is practically impossible and obtaining densities lower than approximately 500 kg/m$^3$ already involves accepting a high percent of open cells in the material.

In order to obviate these limits, which cannot be accepted when the production of toroidal manufactured articles of the above type is involved, in accordance with the production techniques currently in use the raw semifinished product is introduced into the cavity of a mold the sizes of which are slightly bigger than those of the semifinished product and surely smaller than those of the manufactured article to be made. Under this situation the semifinished product is submitted to a semivulcanization step during which the expansion of the gases generated by foaming agents is inhibited in order to enable the material surrounding the individual cells to undergo a sufficient solidification by effect of cross-linking.

The mold is subsequently opened thereby enabling the expansion of the semifinished product that will be afterwards removed from the mold for completion of the vulcanization process in hot air.

SUMMARY OF THE INVENTION

In accordance with the present invention it has been found that for making closed-cell toroidal manufactured articles having a low and very low density (even lower than 120 kg/m$_3$), while at the same time ensuring the complete absence of structural defects, geometric asymmetries and masses, as well as a perfect structural stability of the finished product, the vulcanization of the semifinished product must be conveniently completed within a final vulcanization chamber the shape of which substantially matches the geometric conformation of the finished product and in which the semifinished product will be transferred in the progress of the expansion to which it is submitted, in an appropriate controlled manner, after the semivulcanization chamber has been opened.

In greater detail, the invention relates to a molding process for making toroidal manufactured articles from closed-cell, low-density expanded elastomeric material, characterized in that it further comprises the following steps: creating in the mold, around the semivulcanization chamber and before the opening of said chamber, a pressure adapted to prevent the uncontrolled expansion of the semi-finished product by effect of pressure exerted by the gases generated in the elastomeric material during the semivulcanization step; gradually reducing pressure in the mold after opening of the semivulcanization chamber for causing a controlled expansion of the semifinished product and consequently enabling transferring of the semifinished product from the semivulcanization chamber to a final vulcanization chamber formed in the mold around the semivulcanization chamber itself; closing the final vulcanization chamber around the semifinished product; completing the vulcanization of the semifinished product in the final vulcanization chamber; opening the mold and extracting the finished product. A further step of further reducing the inner mold pressure after the final vulcanization chamber has been closed is also provided, in order to let the semifinished product to expand so that it completely occupies the final vulcanization chamber.

If the pressure created in the mold around the semivulcanization chamber, before the opening thereof, is of a lower value than that of the gases generated in the elastomeric material, the pressure difference must be in all cases sufficient to prevent the occurrence of a violent expansion of the manufactured article during the mold opening; therefore preferably pressure will have the same value as, or a higher value than, the inner pressure of the manufactured article.

The pressure reduction in the mold after the semivulcanization chamber has been opened, takes place until a pressure value has been reached in the presence of which the semifinished product has an internal diameter not smaller than that of the final vulcanization chamber and an overall volume not higher than that of the final vulcanization chamber.

Preferably, after the semivulcanization step the elastomeric material forming the semifinished product is cross-linked to an extent between 30% and 70%.

In one particular embodiment, closing of the final vulcanization chamber involves the following further steps: reducing pressure in the mold as far as the internal diameter of the semifinished product is larger than the internal diameter of the final vulcanization chamber; closing the final vulcanization chamber at its inner peripheral edge; increasing pressure within the mold until the external diameter of the semifinished product is smaller than the external diameter of the final vulcanization chamber; closing the final vulcanization chamber at its external peripheral edge; reducing the inner mold pressure in order to let the semifinished product to expand so that it completely occupies the final vulcanization chamber.

Still in accordance with the present invention, the above process is put into practice by a vulcanization apparatus for making toroidal manufactured articles from closed-cell, low-density expanded elastomeric material, characterized in that it further comprises: a final vulcanization chamber formed in the half-molds around the semivulcanization chamber and designed to receive the semifinished product from the semivulcanization chamber, when the half-molds are brought from the closed condition to a semiopen condition intermediate said open and closed condition; sealing means acting between the half-molds for hermetically isolating the semivulcanization and vulcanization chambers from the surrounding environment when said half-molds are in the semiopen condition; feed means for supplying the region between the half-molds with a pressurization fluid when said half-molds are brought to the semiopen condition.

BRIEF DESCRIPTION OF THE DRAWINGS

Further features and advantages will become more apparent from the detailed description of some preferred embodiments of a molding process for making toroidal manufactured articles from closed-cell, low-density expanded elastomeric material, and the related apparatus, in accordance with the present invention, which description will be given hereinafter by way of non-limiting example with reference to the accompanying drawings, in which:

FIG. 1 is a diagrammatic diametrical sectional view of a mold, in the open condition, this mold being used for putting into practice the process of the invention according to a first embodiment thereof;

FIG. 2 shows a semifinished product introduced into a semivulcanization chamber of the mold in FIG. 1, in the closed condition;

FIG. 3 shows an operating step in which the transferring of the semifinished product from the semivulcanization chamber to a final vulcanization chamber is caused within the semi-open mold;

FIG. 4 shows the semifinished product during the final vulcanization step within the closed mold;

FIG. 8 shows the step involving the closure of the final vulcanization chamber at its inner circumferential edge;

FIG. 9 shows the semifinished product completely enclosed in the final vulcanization chamber;

FIG. 10 shows the step in which the mold is opened and the finished product is extracted therefrom.

DETAILED DESCRIPTION OF THE INVENTION

Figure 5:
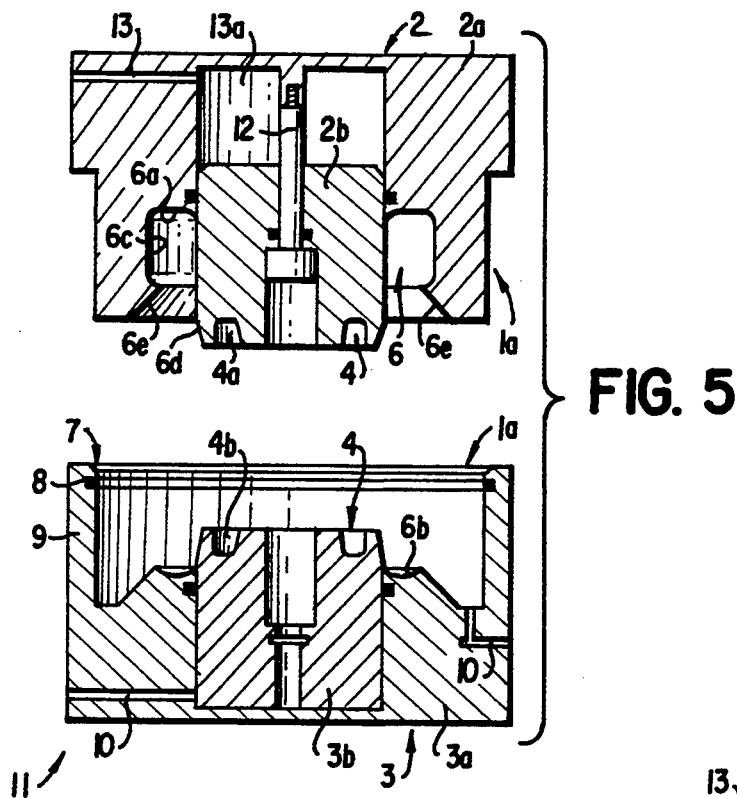
FIG. 5 is a diagrammatic diametrical sectional view of a molding apparatus used for carrying out the process in question, according to a second embodiment thereof.

Referring particularly to FIGS. 1 to 4, a molding apparatus for making toroidal manufactured articles from closed-cell, low-density expanded elastomeric material in accordance with one embodiment of the present invention has been generally identified by reference numeral 1.

Apparatus 1 comprises a vulcanization mold 1a associated with a vulcanization press not shown as known per se and not of importance to the ends of the invention. The mold 1a consists of a first half-mold and a second half-mold 2, 3, which are axially movable by means known per se and therefore not shown, between a closed condition in which they are located close to each other, as shown in FIGS. 2 and 4 for example, and an open condition in which they are spaced apart from each other, as shown in FIG. 1.

Defined between the half-molds 2, 3 in the closed condition by first and second halves 4a, 4b formed in the half-molds respectively, is at least one semivulcanization chamber 4 designed to house a toroidal semifinished product 5 made of raw elastomeric material. Preferably, the sizes of the semivulcanization chamber 4 are slightly bigger than those of the raw semifinished product 5, to an extent of approximately 10% in volume.

According to the present invention, also defined between the half-molds 2,3 in the closed condition, by means of first and second halves 6a, 6b as well, respectively associated with the half-molds 2,3, is a final vulcanization chamber 6 extending coaxially around the semivulcanization chamber 4. The final vulcanization chamber 6 substantially has the same geometric conformation and size as the finished product which is provided to be obtained from the semifinished product 5. In greater detail, in the examples shown referring to manufactured articles of approximately 120 kg/m3 density, the final vulcanization chamber 6 has linear sizes which are about twice those of the semivulcanization chamber 4.

A sealing means 7 acts between the half-molds 2, 3. Said means serves to hermetically isolate the semivulcanization and final vulcanization chambers, 4 and 6, from the surrounding environment when the half-molds are in the semiopen condition shown in FIG. 3 for example, which is intermediate said closed and open conditions. In the embodiment shown this sealing means 7 essentially comprises a seal 8 operatively mounted in a cylindrical collar 9 peripherally integral with the second half-mold 3 and designed to coaxially engage the first half-mold 2.

Still in accordance with the present invention, provision is also made for pressurization means for admitting working fluid under pressure to the region between the half-molds 2, 3 and drawing said fluid out of the half-molds following an operating sequence to be described later. In the drawings this pressurization means consists of ducts 10 formed in the second half-mold 3 and opening into the final vulcanization chamber 6 or the semivulcanization chamber 4. Appropriate members for supplying fluid under pressure, which are not described or shown as known per se and in any case the details of which are not of importance to the ends of the invention, are connected to the ducts 10.

In accordance with the process of the invention, in the operating cycle of the molding apparatus 1, there first of all occurs the introduction of the raw semifinished product 5 into the semivulcanization chamber 4. For the purpose, the half-molds 2, 3 are arranged in the open condition so as to enable the raw semifinished product 5 to be placed in the second half 4b of the semivulcanization chamber 4, and to be subsequently enclosed in said semivulcanization chamber, due to the half-molds 2, 3 being moved close to each other, to the closed condition, as shown in FIG. 2.

The semifinished product 5 stays in the semivulcanization chamber 4 for a period of time sufficient to cause the desired degree of cross-linking by heating in the elastomeric material, which heating can be achieved by known and conventional means not described or illustrated, such as for example steam chambers, electric resistors or induction systems associated with the half-molds 2, 3, or by direct heating of the manufactured articles through microwaves.

Advantageously, this cross-linking degree is preferably between 30% and 70%. The achieved cross-linking degree can be easily established by a "rocking-disc vulcanization meter" according to ASTM D 2084-87, that is by adopting techniques and instruments well known and therefore not described.

During the semivulcanization step, the spontaneous generation of gases occurs in the blend of the elastomeric material used, by effect of foaming agents conveniently introduced thereinto, said gases forming small pockets or cells internally of the semifinished product 5. The generation of gases would tend to cause an increase in the volume of the semifinished product 5, but, as the latter is enclosed in the semivulcanization chamber 4, instead of said volume increase there is a gradual increase in the inner pressure in said cells and, therefore, in the pressure exerted by the semifinished product itself in the semivulcanization chamber. This pressure depends on the difference in volume between the raw semifinished product 5 and the semivulcanization chamber 4, as well as on the amount of foaming agents introduced into the blend of the elastomeric material, and can be rather high pressure, often higher than 60 bar.

In confirmation of the above, in the example shown a situation is taken into account, just as an indication, in which the final vulcanization chamber 6 has linear sizes that are twice those of the semivulcanization chamber 4. Under this situation, the semifinished product 5 processed in the semivulcanization chamber 4 must undergo an eightfold volume increase in order to form the finished product, which increase completely relies on the expansion caused by the generation of gases by effect of blowing.

Since the volume of the semivulcanization chamber 4 is approximately 10% greater than the starting volume of the raw semifinished product, as a result, at the end of the process in the semivulcanization chamber, the volume percent of the gases present in the semifinished product cannot be higher than 10%. It follows that for a tenfold volume increase of the semifinished product 5 it would be necessary to increase seventy-one times the gas volume. Taking into account the substantially isothermal expansion undergone by the gases, the pressure reached within the semivulcanization chamber 4 will be in the order of 71 bar.

In the traditional technique the high pressure present in the semivulcanization chamber causes an instantaneous expansion of the semifinished product, as soon as the half-molds are spaced apart from each other and therefore brought from the closed condition to the open condition. Under this situation, the material is practically extruded within the small slit formed between the half-molds, as soon as they are moved apart a few millimeters from each other. This forced passage of the material between the half-mold surfaces gives rise to localized deformations close to the equatorial area of the finished product.

In order to restrain the amount of these localized deformations and obtain an acceptable product, it is necessary to delay the removal of the semifinished product from the semivulcanization chamber until the elastomeric material is cross-linked to a degree higher than 70%, so that it may have a structure exhibiting elasticity and strength features sufficient to make it withstand the above localized stresses.

However, even when this expedient is adopted, the localized deformations in the equatorial regions of the finished product cannot be completely eliminated. In addition, due to the high cross-linking percent exhibited by the material at the end of the semivulcanization step, the material itself is not capable of properly compensating for the expansion of the gases by means of plastic deformations. In other words, the elastomeric material walls separating the individual cells in the finished product are maintained tensioned by effect of pressure exercised by gases. Subsequently, due to the permeability of the elastomeric material, gases will tend to escape from the manufactured article causing a gradual reduction in the size thereof as time goes by.

As can be easily understood from the following, the invention very competently solves all the above problems.

In fact, in an original manner in the present vulcanization process at the end of the semivulcanization step, compressed air or other working fluid under pressure is provided to be supplied through ducts 10 in order to create in the final vulcanization chamber 6 and in all instances in the surrounding inner spaces of the mold 1a with respect to the semivulcanization chamber 4, a pressure sufficient to prevent an instantaneous, violent and uncontrolled expansion of the semifinished product by effect of the pressure exercised by the gases generated in the elastomeric material of the semifinished product 5 during the semivulcanization step; conveniently this pressure will be approximately in the order of and preferably higher than the pressure generated by said gases.

Then the half-molds 2, 3 are increasingly moved apart from each other until the semiopen condition shown in FIG. 3 is reached, in order to cause the opening of the semivulcanization chamber 4, while at the same time maintaining in the mold 1a the pressure that had been created before starting of the opening step. In this way, the pressure of gases produced in the semifinished product is conveniently counteracted, and the semifinished product is prevented from expanding violently and therefore undergoing possible damages due to a forced passage through the slit created at the instant that the half-molds 2, 3 are first moved apart from each other.

The inner pressure in the mold 1a is then gradually reduced, by drawing working fluid out of the ducts 10, so that the semifinished product 5 can expand gradually in a controlled manner by effect of the gases present therein. By effect of said expansion, the semifinished product 5 moves in a self-governing manner from the semivulcanization chamber 3 to the final vulcanization chamber 6.

In the embodiment shown with reference to FIGS. 1 to 4, the extraction of the working fluid and the consequent reduction of pressure in the mold 1a ends at the moment that the semifinished product 5 is perfectly positioned in the final vulcanization chamber 6. In this situation the semifinished product will have an inner diameter equal to or larger than that of the final vulcanization chamber 6 and an overall volume not greater than that of the vulcanization chamber.

The subsequent closing of the final vulcanization chamber 6 around the semifinished product 5 is carried out by moving the half-molds 2,3 again close to each other. The pressure within the mold 1a is further reduced in order to enable the semifinished product to completely occupy the final vulcanization chamber 6, so that it may undergo the final vulcanization step causing the complete cross-linking of the elastomeric material.

At the end of this step the half-molds 2, 3 are moved apart from each other and brought to the open condition, which enables the finished product to be extracted from, and a new semifinished product to be introduced into the semivulcanization chamber 4.

It will be noted that the complete elimination of the risk of damaging the semifinished product 5 during the step involving opening of the semivulcanization chamber 4, enables the semivulcanization step to be stopped when the cross-linking of the elastomeric material has occurred to a relatively moderate degree, within the above specified limits. Thus the elastomeric material is given a strength sufficient to avoid opening of the cells during the expansion of the gases and, at the same time, an appropriate degree of plasticity for promoting the expansion of the gases, eliminating the presence of elastic expansion in the walls separating the individual cells in the finished product. Thus, as compared to the known art, also the problem related to the size reduction of the manufactured articles in time is also greatly reduced.

In addition, by completing the vulcanization cycle at the inside of the mold 1a, a perfect geometric configuration can be given to the finished product, which will offer excellent qualities in the dimensional symmetry and homogeneous mass distribution. This is another important advantage with respect to the known art where, being the final vulcanization completed in the hot air and in the absence of any holding wall adapted to give the manufactured article the due conformation, geometric irregularities in the finished products can be produced. As a result, said finished products undergo strict restrictions in use when fast vehicles are concerned, in which the symmetry and homogeneity of distribution of the revolving masses is of the greatest importance.

A molding apparatus made in accordance with a second embodiment of the present invention is shown in FIGS. 5 to 10 and denoted by reference numeral 11.

For the sake of clarity, parts of the apparatus 11 corresponding in operation to the parts of the previously described embodiment have been allocated identical reference numerals.

As can be seen, also the vulcanization apparatus 11 essentially comprises a mold 1a consisting of a first half-mold and a second half-mold, 2 and 3, which can be moved close to each other, that is brought from an open condition to a closed condition, and define a semivulcanization chamber 3 of marginally larger sizes than those of the raw semifinished product 5, as well as a final vulcanization chamber 6 extending around the semivulcanization chamber 5 and having the same geometric configuration as the finished product identified by 5a in FIG. 10.

Figure 7:
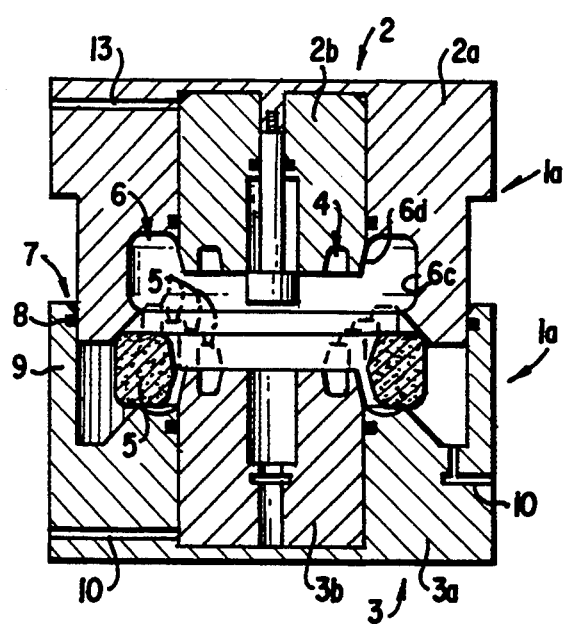
FIG. 7 shows an operating step in which, the mold being semiopen, the transferring of the semifinished product from the semivulcanization chamber to the final vulcanization chamber is carried out.

Provision is made for sealing means 7 designed to isolate the inside of the mold 1a from the surrounding environment when the half-molds 2, 3 are slightly spaced apart from each other in a semiopen condition, as shown in FIG. 7.

A feed means comprising one or more delivery ducts 10 is designed to send compressed air or other working fluid under pressure to the inside of the mold 1a, in synchronism with the succession of the different steps of the vulcanization process.

As compared to the embodiment described with reference to FIGS. 1 to 4, it is in addition provided that at least one of the half-molds 2, 3, the first half-mold 2 disposed on the upper part for example, should essentially comprise an outer annular portion 2a and a central body 2b defining an outer circumferential portion 6c and an inner circumferential portion 6d respectively, of the final vulcanization chamber 6. The central body 2b is axially movable relative to the outer annular portion 2a along a rod 12 upon command of actuator means comprising a delivery duct 13 through which working fluid is admitted to a cylindrical chamber 13a defined in the outer annular portion 2a and slidably and sealingly engaging the central body 2b.

Shifting of the central body 2b takes place between a first position in which the circumferentially outer and inner surface portions, 6c and 6d respectively, of the final vulcanization chamber 6 are disposed in a continuity relationship, and a second position in which the central body 2b projects from the outer annular portion 2a, thereby operatively mating with the corresponding portion of the second half-mold 3 when the half-molds 2, 3 are in the semiopen condition, as shown in FIG. 8.

In the embodiment show, the second half-mold 3 too has an outer annular portion 3a and a central body 3b, substantially similar to those described with reference to the first half-mold 2. In said example, where on the other hand the mobility of the body 3b is not exploited, the working fluid can freely flow from the duct 10 to the cavity or chamber 4 through the central hole of the body 3b.

The operating cycle of the apparatus in the embodiment shown in FIGS. 5 to 10 is as follows.

Figure 6:
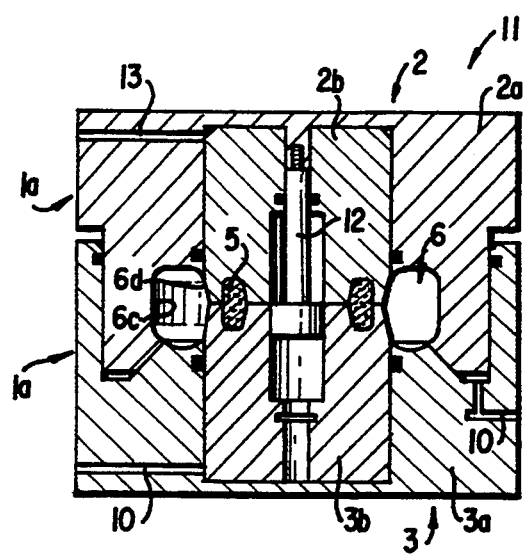
FIG. 6 shows the mold of FIG. 5 in the closed condition, the semifinished product being closed within a semivulcanization chamber.

The mold 1a being arranged in the open condition as shown in FIG. 5, the raw semifinished product 5 is introduced into the semivulcanization chamber 4. The half-molds 2, 3 are then moved close to each other, to the closed position, as shown in FIG. 6, so that semivulcanization of the semifinished product is carried out by effect of heat produced in a conventional manner by the previously mentioned heating means.

At the end of the semivulcanization step, a pressure substantially equal to or higher than the pressure exercised in the semivulcanization chamber 4 by the gases generated inside the semifinished product 5, is created within the mold around the semivulcanization chamber itself.

The half-molds 2, 3 are then moved away from each other, to the semiopen condition as shown in FIG. 7, while a pressure value appropriate to properly counteract the pressure of the gases formed in the semifinished product 5 is kept within the mold. The inner mold pressure is then gradually reduced, so that the semifinished product 5 can expand in a controlled manner as it moves to the final vulcanization chamber 6. During this step the complete elimination of the relative pressure existing within the mold can also be achieved and a vacuum can be even created. In any case, when pressure reduction is stopped, the semifinished product 5 must have an inner diameter larger than the inner diameter of the final vulcanization chamber 6.

Afterwards, through admission of working fluid to the cylindrical chamber 13a, the central body 2b of the first half-mold 2 is driven in motion and it is brought to mate with the central body 3b of the second half-mold 3. In this way the final vulcanization chamber 6 is closed at its inner perimetrical edge, because the mated central bodies 2b, 3b define the overall internal annular surface of the final vulcanization chamber.

Through the ducts 10, working fluid is again admitted to between the half-molds 2, 3 so that a new increase in pressure in the final vulcanization chamber 6 occurs.

During this step, pressure in the final vulcanization chamber 6 is brought to a value generally not higher than 10 bar, and preferably in the range of 3 to 4 bar, and in any case sufficient to make the semifinished product 5 reduce its volume until its outer diameter is sufficiently smaller than the outer diameter of the vulcanization chamber 6.

At this point also the outer annular portion 2a of the first half-mold 2 is moved close to the second half-mold 3, which brings about the complete closure of the mold 1. The working fluid is again extracted from the ducts 10 in order to reduce pressure in the final vulcanization chamber 6, optionally even to a lower value than the atmospheric pressure, so that the semifinished product 5 can completely occupy the internal spaces in said chamber, in order to undergo the final vulcanization step.

When the vulcanization has been completed, the half-molds 2, 3 are moved apart from each other, to the open condition, in order to enable the manufactured article 5a thus obtained to be removed therefrom and a new raw semifinished product to be introduced thereinto.

Advantageously, due to the fact that at least one of the half-molds 2, 3 is divided into two parts, that is the outer annular portion 2a, 3a and the central body 2b, 3b which can mate with the corresponding parts of the opposite half-molds at successive moments and in register with the pressure variations induced in the final vulcanization chamber 6, it is no longer required that a very precise control should be carried out on the pressure present in the final vulcanization chamber 6, on moving of the half-molds 2, 3 close to each other, to the closed condition.

This requirement could in fact occur in the embodiment shown in FIGS. 1 to 4, when there is a risk that the closing movement of the mold may damage either of the outer or inner circumferential edges of the manufactured article.

In addition, it may happen that under given circumstances, with particular materials and/or vulcanization cycles, closing of the mold would necessary involve damaging of the manufactured article, such as for example when the volume of the manufactured article, at the moment that the mold is closed, is greater than the volume of the cavity 6 and at the same time the inner diameter thereof is smaller than the inner diameter of said cavity.

On the contrary, in the solution shown in FIGS. 5 to 10 closing of the vulcanization chamber at the inner circumferential edge and outer circumferential edge thereof occurs at successive moments, in register with pressure values ensuring the absence of interferences of the different mold parts with the semifinished product 5.

It will be however recognized that in both of the proposed solutions the invention enables the expansion of the semifinished product to be efficiently controlled on opening of the semivulcanization chamber, so that said expansion may be properly utilized for achieving the self-governing transferring of the manufactured article to the final vulcanization chamber 6. Due to the controlled expansion of the semifinished product and being the final vulcanization step carried out within the mold, many advantages are achieved on the finished product from a qualitative point of view, with respect to the known art.

In fact, as previously stated, structural defects due to the forced passage of the semifinished product between the half-molds at the first instant that said molds are opened, are eliminated.

In addition, the semivulcanization step can be advantageously stopped when the achieved cross-linking in the elastomeric material is sufficient to impart an appropriate structural stability to the closed cells, which stability is however lower than the limits beyond which the plastic expansion undergone by the manufactured article due to the gas expansion would be inhibited. In this manner the pressure of the gases contained in the closed cells of the manufactured article extracted from the mold will nearly approach atmospheric pressure, and therefore the manufactured article will unlikely undergo undesired size reductions over a period of time.

It is also to be pointed out that, because the vulcanization is completed within the mold, any risks of asymmetric geometries and/or non-homogeneous distribution of the masses in the finished product are eliminated.

In conclusion, all the above special features enable obtaining of perfect manufactured articles even when lower density values than those permitted by the limits of the known art are required.

The first embodiment of the invention as previously described with reference to FIGS. 1 to 4, shows a mold in which the separation surface between the two half-molds is coincident with the equatorial plane of symmetry of the manufactured article.

Conversely, in the embodiment shown in FIGS. 5 to 10 the separation surface between the two half-molds is coincident with the plane of symmetry of the manufactured article only at the inner circumferential edge thereof and it is not coincident with said plane at the outer circumferential edge, where said separation surface is the conical surface 6e shown in FIG. 5.

This last-mentioned solution offers the advantage of ensuring the self-positioning of the semifinished product in a centered position and in coplanar relation with the center line of the mold, in a strictly exact manner with respect to the vulcanization chamber 6.

In fact, during the radial expansion of the semifinished product (FIG. 7), said semifinished product abuts against said conical surface 6e forming a separation between the half-molds, and is therefore forced to place itself in the lower half 6b of said final vulcanization chamber 6 in a geometrically correct position.

In addition, the extraction of the finished product from the mold is also greatly facilitated, irrespective of which half portion of the mold (6b in FIG. 7 and 6d in FIG. 10) is holding the product on opening of said mold.

As is implicit in the above disclosure, the semivulcanization chamber is preferably an inner concentric chamber and the final vulcanization chamber is an outer chamber, concentric around the inner chamber.

Obviously the invention includes all possible changes and modifications which do not constitute a departure from the true scope of this invention as defined by the following claims.

We claim:

1. A molding process for making toroidal manufactured articles from closed-cell, low-density, expanded elastomeric material, comprising the steps of:
   introducing a semifinished product of raw elastomeric material into an annular semivulcanization chamber provided in a mold;
   closing the mold;
   semivulcanizing the semifinished product in the semivulcanization chamber;
   opening the semivulcanization chamber to permit a radial expansion and a consequent transferring of an annular semifinished product formed in the semivulcanization chamber to the outside of said chamber, said process further comprising the following steps:
   creating in the mold, around the semivulcanization chamber and prior to the opening of said chamber, a pressure selected to prevent uncontrolled expansion of the annular semi-finished product by effect of pressure exerted by gases generated in the elastomeric material during the semivulcanization step;
   gradually reducing the pressure in the mold after opening of the semivulcanization chamber to permit a controlled radial expansion of the semifinished product and consequently enabling the transferring of the semifinished product from the semivulcanization chamber to a final vulcanization chamber formed in the mold around the semivulcanization chamber;
   closing the final vulcanization chamber around the semifinished product;
   completing the vulcanization of the semifinished product in the final vulcanization chamber; and
   opening the mold and extracting the finished product.

2. A process according to claim 1, further comprising the step of further reducing the pressure in the mold after the final vulcanization chamber has been closed, in order to let the semifinished product expand so as to completely occupy the final vulcanization chamber.

3. A process according to claim 1, in which the pressure reduction in the mold after opening of the semivulcanization chamber is carried out until a pressure value is reached in the presence of which the semifinished annular product has an inner diameter not smaller than that of the final vulcanization chamber and an overall volume not greater than that of the final vulcanization chamber.

4. A process according to claim 1, including causing, after the semivulcanization step, cross-linking of the elastomeric material forming the semifinished product to an extent between 30% and 70%.

5. A process according to claim 1, in which closing of the final vulcanization chamber involves the following further steps:
   reducing pressure in the mold so that the internal diameter of the semifinished product is larger than the internal diameter of the final vulcanization chamber;
   closing the final vulcanization chamber at its inner peripheral edge;
   increasing pressure within the mold until the external diameter of the semifinished product is smaller than the external diameter of the final vulcanization chamber;
   closing the final vulcanization chamber at its external peripheral edge; and
   reducing the inner pressure in the mold to permit the semifinished product to expand so as to completely occupy the final vulcanization chamber.

6. A molding process for making toroidal manufactured articles from closed-cell, low-density, expanded elastomeric material, according to claim 1, in which said pressure created in the mold around the semivulcanization chamber prior to the opening of said chamber, has a higher value than the pressure exerted by the gases generated in the elastomeric material during said semivulcanization step.

7. A molding process for making toroidal manufactured articles from closed-cell, low-density, expanded elastomeric material, according to claim 1, including heating during said semivulcanization of the semifinished product by the use of microwaves.

8. A molding process for making toroidal manufactured articles from closed-cell, low-density, expanded elastomeric material, comprising the steps of:
   introducing a semifinished product of a raw elastomeric material into an annular semivulcanization chamber provided in a mold;
   closing the mold;
   semivulcanizing the semifinished product in the semivulcanization chamber;
   opening the semivulcanization chamber to permit radial expansion and a consequent transferring of a semifinished annual product to the outside of said chamber, said process further comprising the following steps:
   creating in the mold, around the semivulcanization chamber and before the opening of said chamber, a pressure selected to prevent uncontrolled expansion of the semifinished product by effect of pressure exerted by gases generated in the elastomeric material during the semivulcanization step;
   gradually reducing pressure in the mold after opening of the semivulcanization chamber for causing a controlled expansion of the semifinished product and consequently enabling the transferring of the semifinished product from the semivulcanization chamber to a radically outwardly positioned final vulcanization chamber formed in the mold around the semivulcanization chamber, said pressure reduction being carried out until the inner diameter of the semifinished product is larger than the inner diameter of the final vulcanization chamber;

closing the final vulcanization chamber at its inner peripheral edge;

increasing pressure within the mold so that the outer diameter of the semifinished product is smaller than the outer diameter of the final vulcanization chamber;

closing the final vulcanization chamber at its outer peripheral edge;

reducing the inner pressure of the mold in order to permit the semifinished product to expand radially so as to completely occupy the final vulcanization chamber;

completing the vulcanization of the semifinished product in the final vulcanization chamber; and opening the mold and extracting the finished product.

* * * * *